United States Patent [19]

Ushijima

[11] 4,206,480
[45] Jun. 3, 1980

[54] PICK-UP TUBE CONTROL CIRCUIT

[75] Inventor: Hisashi Ushijima, Atsugi, Japan

[73] Assignee: Sony Corporation, Tokyo, Japan

[21] Appl. No.: 967,896

[22] Filed: Dec. 11, 1978

[30] Foreign Application Priority Data

Dec. 12, 1977 [JP] Japan .............................. 52-149101
Mar. 25, 1978 [JP] Japan .............................. 53-34358

[51] Int. Cl.² .................................................. H04N 5/19
[52] U.S. Cl. ....................................................... 358/219
[58] Field of Search ........................................... 358/219

[56] References Cited
U.S. PATENT DOCUMENTS

| | | | |
|---|---|---|---|
| 3,855,614 | 12/1974 | Okada | 358/219 |
| 3,879,637 | 4/1975 | Woodworth | 358/219 |
| 3,975,657 | 8/1976 | Sato | 358/219 |

*Primary Examiner*—Richard Murray
*Attorney, Agent, or Firm*—Lewis H. Eslinger; Alvin Sinderbrand

[57] ABSTRACT

In a circuit for controlling beam current in an image pick-up tube, suitable bias potentials are applied to the photo-conversion layer and the control grid electrode of the image pick-up tube, and a periodical beam blanking bias is applied to the cathode electrode by means of first and second switching devices, such as transistors, connected in series between different reference potentials with a junction point between the switching devices being connected to the cathode electrode of the pick-up tube, and with a blanking pulse signal controlling the first and second switching devices so tha the latter act in a complemental manner. There is further provided an optimum beam current setting circuit for assuring discharge of the photo-conversion layer of the pick-up tube by the electron beam regardless of changes in brightness of the object image projected on the target electrode, and a circuit for maintaining a desired excess beam current between that at the target electrode and the beam current at the cathode electrode of the pick-up tube.

18 Claims, 1 Drawing Figure

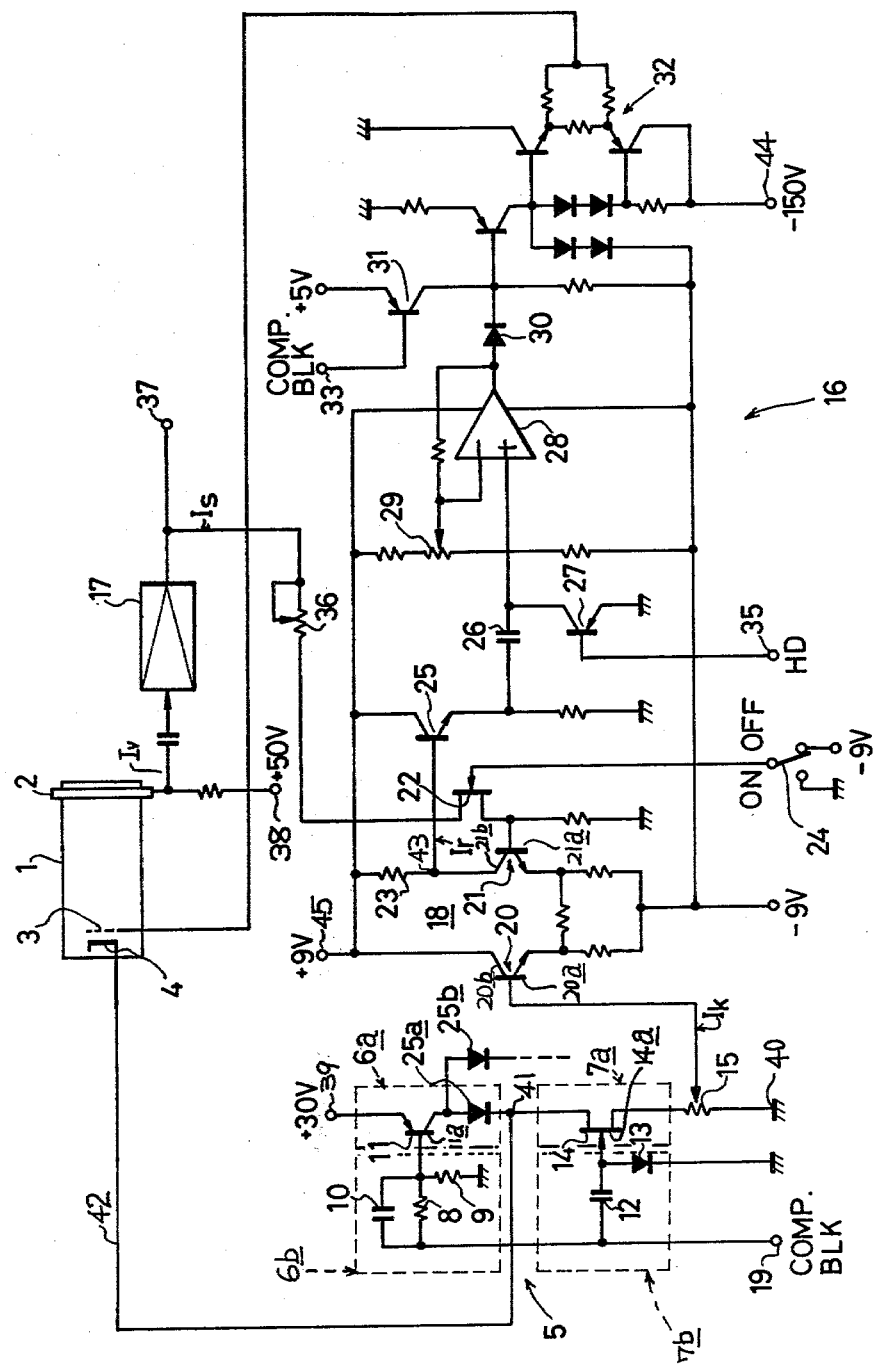

PICK-UP TUBE CONTROL CIRCUIT

BACKGROUND OF THE INVENTION

Field of the Invention

This invention relates to a circuit for controlling beam current in am image pick-up tube, and more particularly to a circuit for controlling beam current in an image pick-up tube in which the electron beam thereof is cut off or blanked during horizontal and vertical retrace intervals.

It is well-known in the television art to cut off or blank the electron beam in an image pick-up tube during horizontal and vertical retrace intervals. Typically, this is accomplished by applying a high positive bias to the cathode electrode and/or a high negative bias to the control grid electrode of the pick-up tube.

Many arrangements are known in the art for blanking the beam current during periodic intervals. One prior art beam blanking circuit employs a series-connected resistor and transistor, the junction of which is connected to a cathode electrode of the pick-up tube. However, in such a device, a DC current path is formed through the series-connected resistor and transistor during each retrace interval as well as during the beam scanning interval. Therefore, there is a relatively large power consumption which is deleterious for battery operated portable cameras. Further, in detecting a cathode current for controlling a beam current in the prior art circuit, additional resistors are required.

OBJECTS AND SUMMARY OF THE INVENTION

Accordingly, it is an object of this invention to provide a circuit for controlling beam current in an image pick-up tube that avoids the above-described difficulties encountered with the prior art.

More specifically, it is an object of this invention to provide a circuit for controlling beam current in an image pick-up tube in which the power requirements thereof are greatly diminished by using two switching devices connected in series with each other.

It is another object of this invention to provide a circuit for controlling beam current in an image pick-up tube in which discharge of the photo-conversion layer by the electron beam is assured regardless of changes in brightness of the object image projected on the target electrode.

It is yet another object of this invention to provide a circuit for controlling beam current in an image pick-up tube in which the electron beam thereof is cut off or blanked during horizontal and vertical retrace intervals by means of a positive bias applied to the cathode electrode and a negative bias applied to the control grid electrode of the pick-up tube.

In accordance with an aspect of this invention, in a circuit for controlling beam current in an image pick-up tube having a cathode electrode for emitting a scanning electron beam, a control grid electrode for regulating the current of the beam at the cathode electrode, and a target electrode having a photo-conversion layer from which a video output signal is obtained in correspondence to an object image projected on the target electrode as the latter is scanned by an electron beam; there are provided means for supplying a bias potential to the photo-conversion layer; means for supplying another bias potential to the control grid electrode of the image pick-up tube; and means for supplying a periodical beam blanking bias to the cathode electrode including first and second switching devices connected in series between two different reference potentials and each having a respective control electrode, means for connecting a junction point of the series-connected first and second switching devices to the cathode electrode of the image pick-up tube, and means for supplying a blanking pulse signal to the respective control electrodes of the switching devices so as to control the switching conditions thereof in a complemental manner in response to the blanking pulse signal.

In a preferred embodiment, the first and second switching devices include first and second transistors and the means for supplying a blanking pulse signal from a source thereof to the respective control electrodes of the switching devices includes a resistor and a capacitor connected in parallel between the control electrode of the first transistor and such source, and a capacitor connected between the control electrode of the second transistor and the source of the blanking pulse signal.

Further, in a preferred embodiment, the means for supplying the requisite bias potential to the control grid electrode includes a first amplifier for amplifying the video output signal from the target electrode of the image pick-up tube and a second amplifier of differential type for producing a differential output signal corresponding to the difference between the amplified video output signal from the first amplifier and an output signal from the second switching device. Further, there is preferably also provided an optimum beam setting circuit for assuring discharge of the photo-conversion layer by the electron beam regardless of changes in brightness of the object image projected on the target electrode.

The above, and other objects, features and advantages of the invention, will be apparent in the following detailed description of an illustrative embodiment of the invention which is to be read in connection with the accompanying drawing.

BRIEF DESCRIPTION OF THE DRAWING

The single view of the drawing is a schematic diagram of a circuit for controlling beam current in an image pick-up tube according to one embodiment of this invention.

DESCRIPTION OF THE PREFERRED EMBODIMENT

Referring to the drawing in detail, the invention is there shown embodied in a circuit for controlling beam current in a conventional image pick-up tube 1 of the type having a cathode electrode 4 for emitting a scanning electron beam, a control grid electrode 3 for regulating the current of the beam at the cathode electrode 4, and a target structure 2 having a photo-conversion layer from which a video output signal $I_v$ is obtained in correspondence to an object image suitably projected on target structure 2 as the latter is being scanned by the electron beam.

The illustrated circuit for controlling beam current generally includes means, such as, a terminal 38, for supplying a bias potential, for example, +50 volts, to the photo-conversion layer of target 2 in image pick-up tube 1, a circuit 16 for supplying another bias potential to control grid electrode 3, and circuit 5 for supplying a periodical beam blanking bias to cathode electrode 4.

The circuit 5, hereinafter referred to as the beam blanking circuit, includes first and second switching devices 6a and 7a, respectively, connected in series between two different reference potentials indicated at 39 and 40, respectively, and which are constituted by a terminal receiving a +30 V DC voltage and a connection to ground. Each of switching devices 6a and 7a is shown to have a respective control electrode 11a and 14a. First switching device 6a is preferably an inverting circuit, including a transistor 11, preferably a PNP bipolar junction transistor having its base constituting the respective control electrode 11a. The emitter of transistor 11 is connected to the reference potential 39 constituted by the terminal receiving the +30 V DC supply, and the collector or output of transistor 11 is connected to cathode electrode 4 of image pick-up tube 1 through a diode 25a. The collector of transistor 11 may also be connected to the cathode electrode of another pick-up tube (not shown) through a second diode 25b in order to separate the cathode electrodes in a color television camera using two or more pick-up tubes. In this regard, by using a plurality of diodes 25a, 25b, etc., switching circuit 6a can be common to a plurality of beam blanking circuits 5 when two or more pick-up tubes 1 are to be controlled.

Second switching circuit 7a is also an inverting circuit and includes a transistor 14, preferably in the form of an N-channel field effect transistor, having its gate constituting the respective control electrode 14a and its drain connected to cathode electrode 4 of image pick-up tube 1. The source of field effect transistor 14 is connected to the reference potential 40 constituted by the connection to ground, through a variable resistor 15. It will be seen that transistor 11 is in series with transistor 14, and the collector of transistor 11 is attached through diode 25a to the drain of transistor 14 at a junction point 41 which is connected to cathode electrode 4 by any suitable means, such as, a connecting wire 42.

Beam blanking circuit 5 further includes first and second blanking pulse signal circuits 6b and 7b, respectively, for supplying a blanking pulse signal BLK from a source or terminal 19 to the respective control electrodes 11a and 14a of the first and second switching devices 6a and 7a so as to control the switching conditions thereof in a complementary manner in response to the blanking pulse signal BLK. As shown in the drawing, first blanking pulse signal circuit 6b preferably includes a resistor 8 and a capacitor 10 connected in parallel between the base 11a of transistor 11 and the source 19 of blanking pulse signal BLK. Capacitor 10 is a speed-up condensor for improving the wave form of the blanking signal at its leading and trailing edges. A resistor 9 is preferably connected between the base 11a of transistor 11 and the ground potential. Second blanking pulse signal circuit 7b includes a capacitor 12 connected between the source 19 of blanking pulse signal BLK and gate 14a of field effect transistor 14. A diode 13 is connected between gate 14a of transistor 14 and the ground potential for clamping the blanking pulse signal BLK to ground potential.

In operation, composite blanking pulse signal BLK, including horizontal and vertical blanking pulses of negative polarity, is supplied to first and second blanking pulse signal circuits 6b and 7b from source 19. During horizontal and vertical retrace intervals, when the blanking pulse BLK is of a low value, transistor 11 is activated or made conductive and transistor 14 is cut off. As a result, a blanking bias voltage from source 39, preferably of a value of +30 volts, is supplied to cathode electrode 4 of pick up tube 1 through diode 25a, causing the electron beam of pick up tube 1 to be cut off or blanked. During these retrace intervals, the collector current of transistor 11 has a value of approximately 0. During each horizontal scanning period, when the blanking pulse BLK is of a relatively high value, transistor 11 is cut off and transistor 14 is activated or made conductive, causing a cathode current, corresponding to the current of the electron beam at cathode electrode 4, to flow through the source or output of transistor 14. Such cathode current is detected by variable resistor 15 in the source leg and the resulting signal $I_k$ therefrom is applied to automatic beam control circuit 16. It is to be noted that signal deterioration at the trailing edge of the blanking signal wave form, and which is due to the collector capacitance $C_{ob}$ of transistor 11, may be reduced by assigning a lower resistance value to variable resistor 15. Further, it is readily seen that, since switching device 6a and 7a in beam blanking circuit 5 operate in a complementary manner during beam scanning intervals, and vertical and horizontal retrace intervals, the impedance of the circuit can be reduced thereby permitting faster electron beam switching operation. Furthermore, since a field effect transistor, which has a better switching characteristic for an analog signal than that of a bi-polar junction transistor, is used in second switching circuit 7a, the switching state of beam blanking circuit 5 is not greatly affected by the cathode current detecting resistor 15 provided in the source leg of transistor 14.

Referring again to the drawing, it will be seen that automatic beam control circuit 16 includes a first amplifier 17 for amplifying the video output signal $I_v$ from target structure 2 of image pick-up tube 1 to provide an amplified video output signal $I_s$.

Automatic beam control circuit 16 further includes a second amplifier 18 of differential type for producing a differential output signal corresponding to the difference between amplified video output signal $I_s$ from first amplifier signal 17 and the output signal $I_k$ from the movable terminal of variable resistor 15. Second amplifier 18 preferably includes two transistors 20 and 21, which are desirably bi-polar junction transistors, connected for differential operation and having respective input or base electrodes 20a and 21a and output or collector electrodes 20b and 21b. The collector 21b through a resistor 23, and the collector 20b are biased by a positive voltage, for example, +9 volts received at the terminal 45, as shown in the drawing. The signal $I_k$ from variable resistor 15, which corresponds to the current of electron beam at cathode electrode 4 of pick-up tube 1, is supplied to base 20a of transistor 20 and the amplified video output signal $I_s$, corresponding to the output signal of pick-up tube 1, is supplied, through a variable resistor 36 and a field effect transistor 22, to base 21a of transistor 21. A signal $I_r$, corresponding to the difference between the output signal $I_k$ from variable resistor 15 and the amplified video output signal $I_s$, i.e., $I_k-I_s$, is obtained at a junction 43 of collector 21b of transistor 21 with resistor 23. The signal $I_r$ corresponds to the excess beam current between that at the target electrode 2 and the beam current at the cathode electrode 4 of pick-up tube 1.

Field effect transistor 22 acts as a third switching device for interrupting application of the amplified video output signal $I_s$ to second amplifier 18. In this regard, a switch 24 is connected to the gate of transistor 22 to selectively connect the gate to a first potential, e.g., ground potential, to activate transistor 22 and a second potential, e.g., −9 volts, to cut-off transistor 22.

Automatic control circuit 16 further includes an optimum beam setting circuit, to which the signal $I_r$ is supplied, for assuring discharge of the photo-conversion layer of target structure 2 by the electron beam regardless of changes in brightness of the object image projected on the target electrode. The optimum beam setting circuit includes a third amplifier 28, preferably an operational amplifier, and means including a potentiometer 29 for supplying an adjustable bias to operational amplifier 28. Potentiometer 29 is connected between a bias voltage, such as, the voltage supply terminal 45 and a inverting input (−) of operational amplifier 28. The signal $I_r$ is supplied to an non-inverting input (+) of operational amplifier 28 through a buffer transistor 25, a clamp capacitor 26 and a clamp transistor 27. Negatively biased horizontal synchronizing signals HD are supplied to the base electrode of clamp transistor 27 through a terminal 35 so that the output of buffer transistor 25 is clamped to ground potential during the horizontal blanking intervals.

The output of operational amplifier 28 is supplied to an output amplifier 32, including a SEPP circuit, through a diode 30 and a clamp transistor 31. Output amplifier 32 has a negative blanking bias voltage, preferably of approximately −150 V. applied to it by way of a terminal 44, and the blanking pulse signal BLK is also supplied to the base electrode of clamp transistor 31 so that the negative blanking bias voltage of −150 V. is supplied to the control grid electrode 3 of pick-up tube 1 during the blanking or horizontal and vertical retrace intervals.

In operation, the optimum beam setting circuit is first adjusted to keep the signal $I_r$ at a constant value. In setting the optimum beam setting circuit, a bias voltage of −9 volts is supplied to transistor 22, through switch 24, to cut off transistor 22. A reference light, having far greater brightness, for example, three times that of an object image under typical operating conditions, is projected on target 2 of pick-up tube 1. Potentiometer 29 is then adjusted to a point where further adjustment thereof is ineffective to further increase the video output signal $I_v$, that is, to a value just before the current of the electron beam at cathode electrode 4 causes saturation of the amplified video output signal $I_s$. The value of the signal $I_s$ may be observed with an oscilloscope or the like. In this manner, the photo-conversion layer of the pick-up tube 1 is discharged by an electron beam having a current three times as large as that necessary to discharge the positive charge under typical operating conditions. Accordingly, during typical operating conditions, discharge of the positive charge formed on the photo-conversion layer will always be achieved. Further, since the signal $I_s$ is cut off by field effect transistor 22 during the optimum beam setting operation, the change of beam current directly corresponds to the setting of the potentiometer 29. Thus, the optimum beam setting operation can be easily performed. In addition, since there is a lower value of electron beam current due to a lower brightness of the object image, there will be no lowering of the resolution of the image.

Accordingly, the amount of excess beam current $I_r$ is kept constant by the automatic beam control circuit 16 and the potential of control grid electrode 3 is controlled so that the photo-conversion layer is scanned by an electron beam having a current larger, by a predetermined amount, than the current necessary to discharge the photo-conversion layer. Thus, the total beam current at cathode electrode 4 is controlled to follow brightness changes of the object image projected on the target 2 and a stable video signal is supplied to output terminal 37.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A circuit for controlling beam current in an image pick-up tube having a cathode electrode for emitting a scanning electron beam, a control grid electrode for regulating the current of said beam at said cathode electrode, and a target electrode having a photo-conversion layer from which a video output signal is obtained in correspondence to an object image projected on said target electrode as the latter is scanned by said electron beam, said circuit comprising:

means for supplying a bias potential to said photo-conversion layer;

means for supplying another bias potential to said control grid electrode of the image pick-up tube; and means for supplying a periodical beam blanking bias to said cathode electrode including first and second switching devices connected in series between two different reference potentials and each having a respective control electrode, means for connecting a junction point of said series-connected first and second switching devices to said cathode electrode of said image pick-up tube, and means for supplying a blanking pulse signal to the respective control electrodes of said switching devices so as to control the switching conditions thereof in a complemental manner in response to said blanking pulse signal.

2. A circuit according to claim 1; wherein said first switching device is a transistor having a base constituting said respective control electrode and further having an output connected to said cathode electrode of said image pick-up tube; and wherein said means for supplying the blanking pulse signal to the control electrode of said first switching device includes a source of said blanking pulse signal, and a resistor and a capacitor connected in parallel between said base of said transistor and said source.

3. A circuit according to claim 2; wherein said transistor is a PNP type bi-polar junction transistor having an emitter connected to a first one of said reference potentials and a collector constituting said output, and further including a diode through which said collector is connected to said cathode electrode of said image pick-up tube.

4. A circuit according to claim 2; wherein said second switching device includes a second transistor having an output circuit thereof controlled by said respective control electrode and connected to said cathode electrode of said image pick-up tube; and wherein said means for supplying the blanking pulse signal to the control electrode of said second switching device includes a capacitor connected between said control electrode and said second transistor and said source of the blanking pulse signal, and a diode connected between said control electrode and said second transistor and a ground potential for clamping said blanking pulse signal to ground potential.

5. A circuit according to claim 4; wherein said second transistor is an N-channel field effect transistor having a source-drain circuit constituting said output circuit with the drain thereof connected to said cathode electrode of said image pick-up tube, and further including a variable resistor through which the source of said field effect transistor is connected to the other of said reference potentials.

6. A circuit according to claim 1; wherein said first switching device is activated upon the application of said blanking pulse signal thereto and cut-off upon the removal of said blanking pulse signal, and said second switching device is cut-off upon the application of said blanking pulse signal and activated upon the removal of said blanking pulse signal.

7. A circuit according to claim 1; wherein said means for supplying another bias potential to said control grid electrode includes a first amplifier for amplifying said video output signal from said target electrode of said image pick-up tube and a second amplifier of differential type for producing a differential output signal corresponding to the difference between said amplified video output signal from said first amplifier and an output signal from said second switching device.

8. A circuit according to claim 7; wherein a variable resistor is connected between said second switching device and the respective reference potential associated therewith for producing said output signal from said second switching device.

9. A circuit according to claim 7; wherein said second amplifier includes first and second transistors connected for differential operation and having respective input electrodes and output electrodes, and means connecting together said output electrodes; and wherein said output signal from said second switching device is supplied to the input electrode of said first transistor and said amplified video output signal from said first amplifier is supplied to the input electrode of said second transistor.

10. A circuit according to claim 7; wherein said means for supplying another bias potential to said control grid electrode includes a third switching device interposed between said first amplifier and said second amplifier for interrupting application of said amplified video output signal to said second amplifier.

11. A circuit according to claim 10; wherein said means for supplying another bias potential to said control grid electrode further includes an optimum beam setting circuit for assuring discharge of said photo-conversion layer by said electron beam regardless of changes in brightness of said object image projected on said target electrode, said optimum beam setting circuit including a third amplifier, and means for supplying an adjustable bias to said third amplifier including a potentiometer.

12. A circuit according to claim 11; wherein with said third switching device being turned off, said potentiometer is adjusted to a point where further adjustment thereof is ineffective to increase the video output signal while a reference light, having greater brightness than that of an object image under typical operating conditions, is projected on said target electrode.

13. A circuit according to claim 11; wherein said third amplifier is an operational amplifier having a inverting input, and said means for supplying an adjustable bias is connected to said inverting input.

14. A circuit according to claim 13; wherein said operational amplifier further has an non-inverting input, and said means for supplying another bias potential includes a buffer transistor, a clamp capacitor and a clamp transistor through which said differential output signal is supplied to said non-inverting input.

15. A circuit according to claim 11; wherein said means for supplying another bias potential to said control grid electrode includes a fourth amplifier having an input thereof connected to the output of said third amplifier and having an output thereof connected to said control grid electrode.

16. A circuit for controlling beam current in an image pick-up tube having a cathode electrode for emitting a scanning electron beam, a control grid electrode for regulating the current of said beam at said cathode electrode, and a target electrode having a photo-conversion layer from which a video output signal is obtained in correspondence to an object image projected on said target electrode as the latter is scanned by said electron beam, said circuit comprising:

means for supplying a bias potential to said photo-conversion layer;

means for supplying a periodical beam blanking bias to said cathode electrode; and means for supplying another bias potential to said control grid electrode of the image pick-up tube, including a first amplifier for amplifying said video output signal from said target electrode of said image pick-up tube, a second amplifier of differential type for producing a differential output signal corresponding to the difference between said amplified video output signal from said first amplifier and an output signal from said means for supplying a periodical beam blanking bias, and an optimum beam setting circuit for assuring discharge of said photo-conversion layer by said electron beam regardless of changes in brightness of said object image projected on said target electrode.

17. A circuit according to claim 16; wherein said means for supplying another bias potential further includes a switching device interposed between said first amplifier and said second amplifier for interrupting application of said video output signal to said second amplifier; and wherein said optimum beam setting circuit includes a third amplifier, and means for supplying an adjustable bias to said third amplifier including a potentiometer.

18. A circuit according to claim 16; wherein said second amplifier includes first and second transistors connected for differential operation and having respective input electrodes and output electrodes, and means connecting together said output electrodes; and wherein an output signal from said means for supplying a periodical beam blanking bias is supplied to the input electrode of said first transistor and the amplified video output signal from said first amplifier is supplied to the input electrode of said second transistor.

* * * * *